RESOLVING CIRCUITS

Jan. 27, 1970  R. G. BUSCHER ET AL  3,492,465
REDUNDANT OFF-AXIS SENSORS
Filed Dec. 13, 1965  3 Sheets-Sheet 3

United States Patent Office 3,492,465
Patented Jan. 27, 1970

3,492,465
REDUNDANT OFF-AXIS SENSORS
Richard G. Buscher and Ronald J. Miller, Vestal, N.Y., assignors to General Electric Company, a corporation of New York
Filed Dec. 13, 1965, Ser. No. 513,281
Int. Cl. G06f 15/50; G06g 7/70, 7/78
U.S. Cl. 235—150.25                     7 Claims

ABSTRACT OF THE DISCLOSURE

A control system for vehicles, particularly flight control systems, wherein single failure redundancy of motion sensors is obtained and the quality of motion signals enhanced by minimization of local motions resulting from vehicle body flexing. Sensors in the number of one more than the vehicle axes concerned are placed off-axes both with respect to the vehicle axes and the axes of the other sensors so that there is no "blind spot." Sensor outputs are resolved into signals describing motion about the vehicle axes. Local disturbances are minimized by remote sensor location.

---

This invention relates to improved methods and apparatus for vehicle flight control which employ a set of sensors, such as rate gyros, for measuring vehicle motion and processing the sensor signals to perform functions such as stability augmentation. In particular, the invention is concerned with the efficient utilization of redundant sensors to improve system reliability and to reduce certain noise effects in vehicles such as vibration in aircraft, missiles, and hydrofoil craft.

In order to greatly improve control system reliability, it has generally been found necessary to provide redundancy so that component failures can be corrected. Straightforward failure correction calls for triplicating components and adding voting devices to compare signal levels and effectively disconnect failed components. In a flight control system having a plurality of control channels for controlling motion about various aircraft axes and other variables, tripling the number of equipment components and adding failure detection components greatly increases the cost, weight, size and complexity of the system.

With the continuing increase in the speed of aircraft and missiles, there has also been a continuing increase in sensor noise problems. In addition to conventional noise problems to be expected of sensors, flight control systems provide a special area of noise problems. Sensing instruments in aircraft are mounted on surfaces that are intended to be fixed relative to the vehicle frame, which is treated as a rigid body. However, vehicles are not rigid bodies. Particularly with high performance vehicles, all parts move and vibrate relative to the net vehicle motion. Sensors measure the sum of the net vehicle motion plus the motion of the mounting surface relative thereto. Measurement of the latter is noise from the point of view of system requirements.

In addition to obscuring the rigid body motion, the measurement of vehicle internal oscillations can readily cause regenerative oscillation if the resulting control operations have the required frequency and phase relationship. For this reason, it is essential that signals representing vibrations, etc., be largely removed from vehicle control loops. While this problem can be alleviated by the use of a number of duplicate sensors which are averaged, this is very difficult and expensive where there are a number of variables to be measured.

Accordingly, it is an object of the invention to provide a multi-axis control system employing redundant sensors for failure correcting in which the number of components required for redundancy is substantially reduced.

A further object of the invention is to provide a vehicle control system in which the effects of sensor noise, particularly the noise originating with mounting surface motion relative to the net vehicle motion is substantially reduced.

Briefly stated, in accordance with certain aspects of the invention, a control system is provided which utilizes a plurality of off-axis sensors to economically provide both failure correction and noise reduction. The relative emphasis on signal-to-noise ratio improvement or in reliability is a matter of choice. It has been discovered that, to a selected degree, system stability is augmented by channel interactions; and/or redundant sensor signals can be processed with variable weighting or gain devices to correct long term sensor failure.

The invention, together with further objects and advantages thereof, may best be understood by referring to the following description taken in conjunction with the appended drawings in which like numerals indicate like parts and in which.

Figure 1:
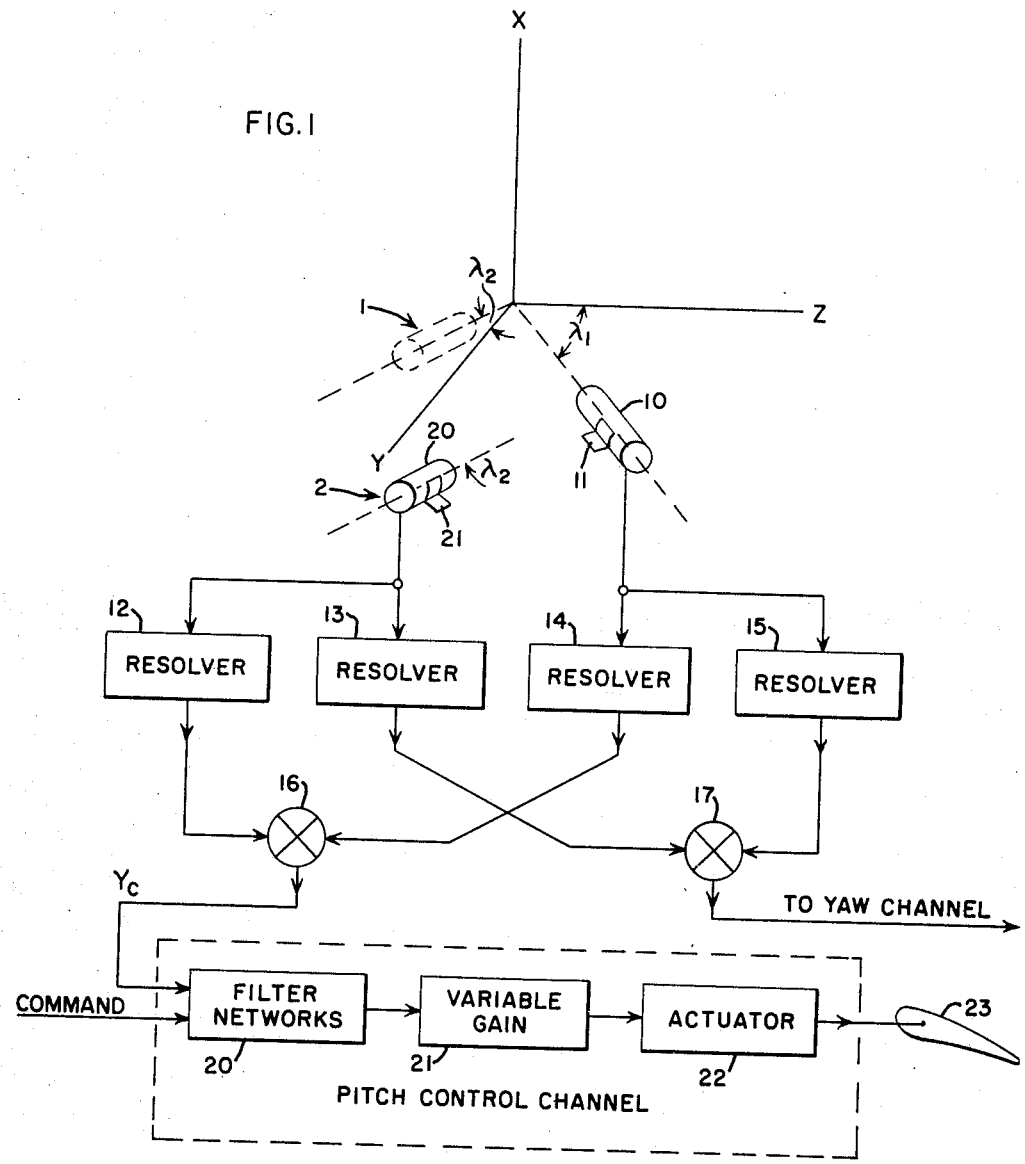
FIGURE 1 illustrates a simple embodiment of the invention.

FIGURE 1 is a block diagram illustrating one simple form of the invention. This simple form of the invention is described since it is a limited application of the principle of using four sensors with three axes oriented at equal angles to each other to provide complete coverage with one sensor failure redundancy. A set of sensors provides redundant sources of flight control system signals. A pair of conventional single-axis rate gyros 10 and 20 are mounted on brackets 11 and 21 respectively at substantially different locations in the craft. Conveniently, the gyros 10 and 20 are each mounted with their measuring axes 45° from the pitch and yaw axes, Y and Z respectively, but having their measuring axes parallel to the plane containing the pitch and yaw axes (Y and Z). Also, the gyro locations are sufficiently spaced that the gyro mounting brackets do not vibrate in phase as a result of structural vibration.

The output of the sensors are applied to resolvers 12–15 where the components of the rate signal along the pitch and yaw axes are derived in accordance with the orientation of the respective resolvers. The outputs of resolvers 12 and 13 are applied to the summing device 16 to provide the feedback signals for the pitch control channel of the vehicle flight control system. The original input signal to the pitch control channel is combined with Yc the feedback signal in filter networks 20 in the manner described in Proceedings of the 1961 Western Electronic Show and Convention (WESCON), "Self Adaptive Control Through Frequency Regulation" by R. G. Buscher, K. B. Haefner and M. F. Marx. See also Patent No. 3,412,299, "Adaptive Control System and Method," issued Nov. 19, 1968, to Richard G. Buscher and Glen W. Walker. In flight control systems of this type, a variable gain device 21 is controlled so as to maintain the flight control system channels essentially invariant in spite of changes in conditions or aging of components. The control signal is applied to an actuator 22 which controls the position of the vehicle control surface 23. By being mounted in the vehicle, gyros 10 and 20 detect the response to the control surface 23 displacements and thereby generate the feedback signals.

The total motion of a vehicle can be described by superposition of the various elements of motion. Thus, angular rate representation is, for example:

$$\theta = \theta_R + \theta_D$$

where:
$\theta_R$ = rigid body rate
$\theta_D$ = structural deflection rate

Consider first the orthodox position of rate sensors. The outputs of sensors aligned with vehicle control axes $x$, $y$, and $z$ are:

Pitch channel: $\theta_R + \theta_D$ motion about $y$ axis
Yaw channel: $\ddot{\psi}_R + \ddot{\psi}_D$ motion about $z$ axis
Roll channel: $\theta_R + \theta_D$ motion about $x$ axis The R subscripts indicate rigid body contributions ($\theta_R$, etc.) and the D subscripts indicate structural deflection contributions ($\theta_D$, etc.).

With vector notation, these outputs are written as:

Pitch channel: $Y_R + Y_D$
Yaw channel: $Z_R + Z_D$
Roll channel: $X_R + X_D$

These orthodox sensors are insensitive to motions about any control axis, but the one along which each is aligned.

The sensors 10 and 20, however, are aligned off the control axis $y$ and $z$. They are insensitive, in this example, to motions about the $x$ control axis. Thus, the outputs of sensors 10 and 20 are composed of components of pitch and yaw motion (motion about $y$ and $z$ control axis, respectively).

Considering both rigid and structural contributions: Sensor 10 gives:

(1) $\quad (Y_R + Y_D) \sin \lambda_1 + (Z_R + Z_D) \cos \lambda_1$ and sensor 20 gives:

(2) $\quad (Y_R + Y_D) \cos \lambda_2 - (Z_R + Z_D) \sin \lambda_2$

These quantities added and subtracted give either $(Z_R + Z_D)$ or $(Y_R + Y_D)$. The displaced location for gyro 20 is point 2. With numeral subscripts indicating location, sensor 10 reads out:

(3) $\quad (Y_{R1} + Y_{D1}) \sin \lambda_1 + (Z_{R1} + Z_{D1}) \cos \lambda_1$

Sensor 20 reads out:

(4) $\quad (Y_{R2} + Y_{D2}) \cos \lambda_2 - (Z_{R2} + Z_{D2}) \sin \lambda_2$

The above two equations are solved for $Y_c$ and $Z_c$ which are to be fed back in the flight control channel to be compared with the desired input.

(5) $Y_c = (Y_{R1} + Y_{D1})b + d(Y_{R2} + Y_{D2})$
$\qquad - c(Z_{R1} + Z_{D1}) + c(Z_{R2} + Z_{D2})$
(6) $Z_c = (Z_{R1} + Z_{D1})d + (Z_{R2} + Z_{D2})b$
$\qquad - a(Y_{R1} + Y_{D1}) + a(Y_{R2} + Y_{D2})$ where $$a = \frac{\sin \lambda_1 \cos \lambda_2}{\cos(\lambda_2 - \lambda_1)}$$

$$b = \frac{\sin \lambda_1 \sin \lambda_2}{\cos(\lambda_2 - \lambda_1)}$$

$$c = \frac{\sin \lambda_2 \cos \lambda_1}{\cos(\lambda_2 - \lambda_1)}$$

$$d = \frac{\cos \lambda_2 \cos \lambda_1}{\cos(\lambda_2 - \lambda_1)}$$

Note that the trigonometric identity exists: $b + d = 1$

Equations 5 and 6 reduce to the following equations, relying on the rigid body motion being invariant with location:

$$Z_{R1} = Z_{R2} = Z_R$$
$$Y_{R1} = Y_{R2} = Y_R$$

(7) $\quad Y_c = Y_R + bY_{D1} + dY_{D2} + c(Z_{D2} - Z_{D1})$
(8) $\quad Z_c = Z_R + dZ_{D1} + bZ_{D2} + a(Y_{D2} - Y_{D1})$ Equations 6 and 7 can be examined to determine the actual effect of the off-axis sensor location.

To a first order approximation the structural disturbances at locations 1 and 2 can be related by:

(9) $\quad Y_{D2} = Y_{D1}(k_y \sin(W_y t + \phi_y))$
(10) $\quad Z_{D2} = Z_{D1}(k_z \sin(W_z + \phi_z))$ These expressions indicate that the structural oscillations are related by a gain ($k$) and a phase $\phi$.

With $\lambda_1 = \lambda_2$ the coefficients of (7) and (8) $a = b = c = d = .5$. If by proper location, the $\phi_y$ and $\phi_z$ are 180° there will be perfect cancellation. Even if the vehicle characteristics are known, this may be difficult. It can be seen, however, that if some "out-of-phaseness" can be guaranteed, the situation can be significantly improved.

In a particular situation, where design data exists, the best results are obtained by positioning the sensors with their sensitive axis aligned along the node of the structural vibration. This will change the value of $\lambda$ for the particular sensors. This is the reason that resolvers 12, 13, 14, and 15 are shown. In the FIGURE 1 example of sensor 10 and 20, the resolvers would be replaced with attenuators of fixed values of .707; i.e. $\lambda_1 = \lambda_2 = 45°$. In the general case $\lambda_2$ will set resolver 12 and 13 and $\lambda_1$ will set resolvers 14 and 15.

The Equations 7 and 8 represent a coupling effect in the feedback loop. From Equation 5, it can be seen that if the Y channel is not being maneuvered (i.e. no Y command) and the Z channel has excessive deflections, then a $Y_c$ signal will exist thus causing signals in the Y channel. This can be visualized as using the one channel as an energy absorber for the other channel.

If one control channel is unstable, the other channel has a capacity to absorb some of the excess energy so that stability exists in both channels. Oscillation in one channel results in oscillation of off-axis sensors and therefore it couples to other channels which partially damp the oscillation. Of course, a highly unstable channel may exceed the capacity of the stable channel and remain unstable or drive both unstable. The point is however that this scheme of energy exchange narrows the range of structural frequencies to which the system responds unstable.

Figure 2:
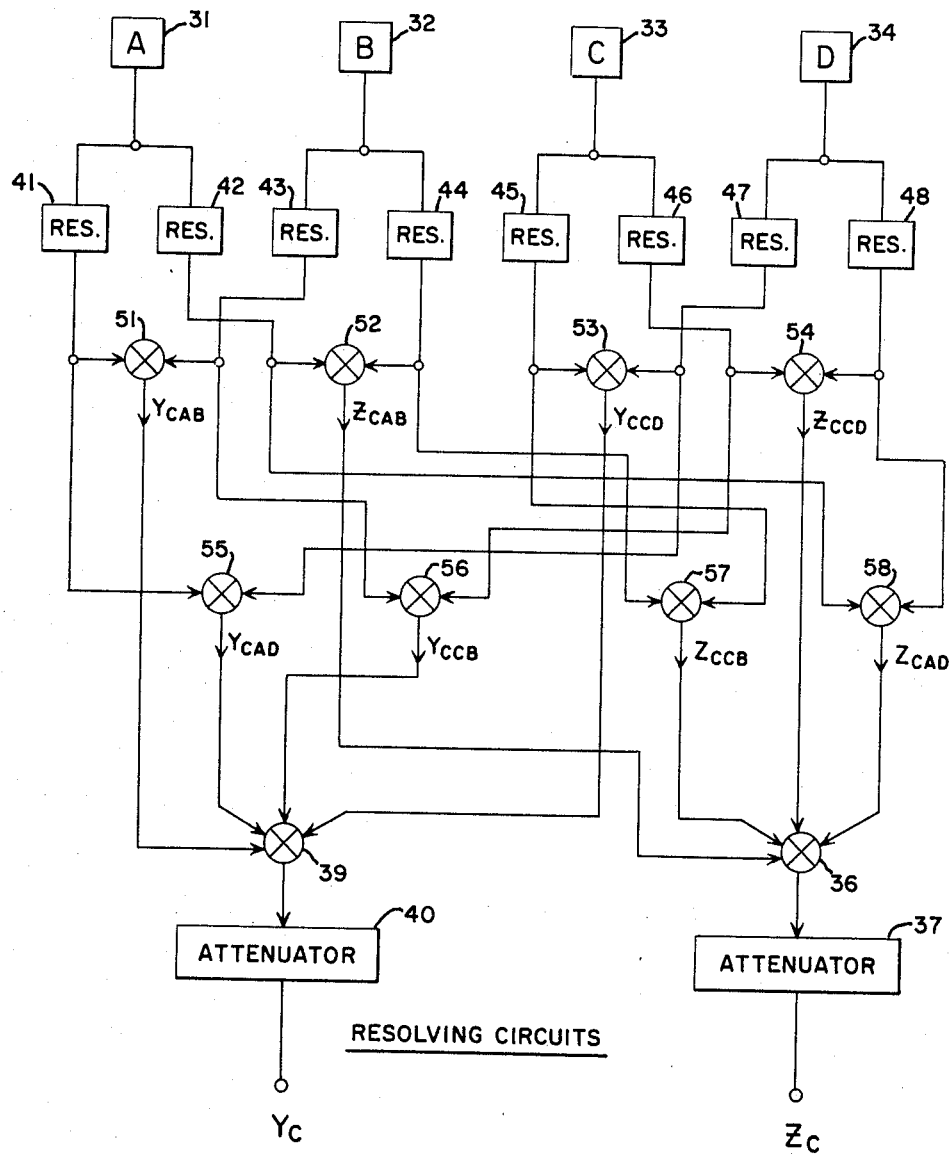
FIGURE 2 illustrates an embodiment of the invention where control functions are performed about two coordinate axes.

In FIGURE 2, a set of four conventional sensors 31–34 for measuring a variable in respect to two axes, Y and Z, provide important improvements in reliability.

The Y and Z rates of the missile are computed by resolvers 41–48 and summers 51–58 using any of the following combinations of sensors:

From A, B compute $Z_{CAB}$, $Y_{CAB}$
From C, B compute $Z_{CCB}$, $Y_{CCB}$
From A, D compute $Z_{CAD}$, $Y_{CAD}$
From C, D compute $Z_{CCD}$, $Y_{CCD}$ These computed rates become:

(R1) $Z_{CAB} = a(Y_{R1} - Y_{R2}) + bZ_{R2} + dZ_{R1}$
$\qquad + bZ_{D2} + dZ_{D1} + a(Y_{D1} - Y_{D2})$
(R2) $Y_{CAB} = c(Z_{R1} - Z_{R2}) + bY_{R1} + dY_{R2}$
$\qquad + bY_{D1} + dY_{D2} + c(Z_{D1} - Z_{D2})$
(R3) $Z_{CCB} = e(Y_{R3} - Y_{R2}) + fZ_{R2} + hZ_{R3}$
$\qquad + fZ_{D2} + hZ_{D3} + e(Y_{D3} - Y_{D2})$
(R4) $Y_{CCB} = g(Z_{R3} - Z_{R2}) + hY_{R2} + fY_{R3}$
$\qquad + hY_{D2} + fY_{D3} + g(Z_{D3} - Z_{D2})$
(R5) $Z_{CAD} = k(Y_{R1} - Y_{R4}) + lZ_{R4} + nZ_{R1}$
$\qquad + lZ_{D4} + nZ_{D1} + k(Y_{D1} - Y_{D4})$
(R6) $Y_{CAD} = m(Z_{R1} - Z_{R4}) + nY_{R4} + lY_{R1}$
$\qquad + nY_{D4} + lY_{D1} + m(Z_{D1} - Z_{D4})$
(R7) $Z_{CCD} = o(Y_{R3} - Y_{R4}) + pZ_{R4} + rZ_{R3}$
$\qquad + pZ_{D4} + rZ_{D3} + o(Y_{D3} - Y_{D4})$
(R8) $Y_{CCD} = q(Z_{R3} - Z_{R4}) + rY_{R4} + pY_{R3}$
$\qquad + rY_{D4} + pY_{D3} + q(Z_{D3} - Z_{D4})$ where a through $q$ are defined as follows:

$$A-B \begin{cases} a = \dfrac{\cos \lambda_2 \sin \lambda_1}{\cos (\lambda_1 - \lambda_2)} \\ b = \dfrac{\sin \lambda_1 \sin \lambda_1}{\cos (\lambda_1 - \lambda_2)} \\ c = \dfrac{\sin \lambda_2 \cos \lambda_1}{\cos (\lambda_1 - \lambda_2)} \\ d = \dfrac{\cos \lambda_2 \cos \lambda_1}{\cos (\lambda_1 - \lambda_2)} \end{cases}$$

Note that:

$$b+d=1$$
$$f+h=1$$
$$l+n=1$$
$$p+r=1$$

$$C-B \begin{cases} e = \dfrac{\cos \lambda_2 \sin \lambda_3}{\cos (\lambda_3 - \lambda_2)} \\ f = \dfrac{\sin \lambda_3 \sin \lambda_2}{\cos (\lambda_3 - \lambda_2)} \\ g = \dfrac{\sin \lambda_2 \cos \lambda_3}{\cos (\lambda_3 - \lambda_2)} \\ h = \dfrac{\cos \lambda_2 \cos \lambda_3}{\cos (\lambda_3 - \lambda_2)} \end{cases}$$

$$A-D \begin{cases} k = \dfrac{\cos \lambda_4 \sin \lambda_1}{\cos (\lambda_1 - \lambda_4)} \\ l = \dfrac{\sin \lambda_1 \cos \lambda_4}{\cos (\lambda_1 - \lambda_4)} \\ m = \dfrac{\sin \lambda_4 \cos \lambda_1}{\cos (\lambda_1 - \lambda_4)} \\ n = \dfrac{\sin \lambda_4 \cos \lambda_1}{\cos (\lambda_1 - \lambda_4)} \end{cases}$$

$$C-D \begin{cases} o = \dfrac{\cos \lambda_4 \sin \lambda_3}{\cos (\lambda_3 - \lambda_3)} \\ p = \dfrac{\sin \lambda_3 \sin \lambda_4}{\cos (\lambda_3 - \lambda_4)} \\ q = \dfrac{\sin \lambda_4 \cos \lambda_3}{\cos (\lambda_3 - \lambda_4)} \\ r = \dfrac{\cos \lambda_4 \cos \lambda_3}{\cos (\lambda_3 - \lambda_4)} \end{cases}$$

Equations R1–R8 reduce to the following equations relying as before on the rigid body motion being invariant with location, i.e.:

$$Z_{R1}=Z_{R2}=Z_{R3}=Z_{R4}=Z_R$$
$$Y_{R1}=Y_{R2}=Y_{R3}=Y_{R4}=Y_R$$

and using $b+d=1, \ldots$, etc.

(R9) $Z_{CAB}=Z_R+bZ_{D2}+dZ_{D1}+a(Y_{D1}-Y_{D2})$
(R10) $Y_{CAB}=Y_R+bY_{D1}+dY_{D2}+c(Z_{D1}-Z_{D2})$
(R11) $Z_{CCB}=Z_R+fZ_{D2}+hZ_{D3}+e(Y_{D3}-Y_{D2})$
(R12) $Y_{CCB}=Y_R+fY_{D3}+hY_{D2}+g(Z_{D3}-Z_{D2})$
(R13) $Z_{CAD}=Z_R+lZ_{D4}+nZ_{D1}+k(Y_{D1}-Y_{D4})$
(R14) $Y_{CAD}=Y_R+lY_{D1}+nY_{D4}+m(Z_{D1}-Z_{D4})$
(R15) $Z_{CCD}=Z_R+pZ_{D4}+rZ_{D3}+o(Y_{D3}-Y_{D4})$
(R16) $Y_{CCD}=Y_R+pY_{D3}+rY_{D4}+q(Z_{D3}-Z_{D4})$

If R9, 11, 13, and 15 are added and divided by 4; and likewise R10, 12, 14 and 16 are added and divided by 4, R17 and 18 result at the outputs of attenuators 37 and 40.

(R17) $Z_c=Z_R+\frac{1}{4}[Z_{D1}(d+n)+Z_{D2}(b+f)+Z_{D3}(h+r)+Z_{D4}(l+p)]+\frac{1}{4}[Y_{D1}(a+k)-Y_{D2}(a+e)+Y_{D3}(e+o)-Y_{D4}(k+o)]$ (R18) $Y_c=Y_R+\frac{1}{4}$ [deflection components similar to above]

If $\lambda_1=\lambda_2=\lambda_3=\lambda_4=45°$
then $a=b=c=\ldots=r=.5$

The deflection components then appear in both equations, but at reduced amplitude. Thus the signal-to-noise ratio is improved.

If a single sensor fails, and this failure opens the output circuit of the failed sensor, then the control signal becomes simply a reduced gain signal, that still contains the pertinent information on the rigid body motion.

For example, if sensor 31 fails, then the signal $Y_C$ becomes:

(R19) $Y_c=\frac{1}{4}[-cZ_{R2}+dY_{R2}+hY_{R2}+fY_{R3}+m(-Z_{R4})+nY_{R4}+rY_{R4}+pY_{R3}]+\frac{1}{4}$ [Deflections]

If $\lambda=45°$ $c=d=f=h=m=n=r=p=.5$

R19 becomes:

(R20) $Y_c=\frac{3}{4}Y_R-\frac{1}{4}Z_R+\frac{1}{4}$ [Deflections]

Likewise, (R21) $Z_c=\frac{1}{4}[a(-Y_{R2})+bZ_{R2}+fZ_{R2}+hZ_{R3}+k(-Y_{R4})+lZ_{R4}+pZ_{R4}+rZ_{R3}]+\frac{1}{4}$ [Deflections]

As before, $a=b=f=h=k=l=p=r=.5$

Thus, R21 becomes:

(R22) $Z_c=\frac{3}{4}Z_R-\frac{1}{4}Y_R+\frac{1}{4}$ [Deflections]

A gain changer in each channel then stabilizes this condition by returning the gain to proper levels. Another partial failure correction option is individual variable attenuation of the sensor signals. Where individual failure detection is practical, this option is recommended for optimum performance.

From the summed Equation R18, if either A and B, C and D, A and D or B and D fail, the output would not be effectively changed other than a gain loss which the self-adaptive control channel could recover. This case is shown in the equation below:

(R23) $Y_c=\frac{1}{2}Y_R+\frac{1}{4}$ [Deflections]

Equations R19 and R23 both represent signal-to-noise ratios that would favor a stable signal. Thus the only failures of interest are if A and C or B and D fail.

The probability of failure is then:

$$P_r(\text{fail})=P_r(A \text{ and } C)+P_r(B \text{ and } D)$$

If A, B, C, and D are independent in failure modes, then:

$$P_r(B \text{ and } D)=P_r(B) \cdot P_r(D)$$
$$P_r(A \text{ and } C)=P_r(A) \cdot P_r(C)$$

or $$P_r(\text{failed system})P_r(B) \cdot P_r(D)+P_r(A) \cdot P_r(C)$$

with sensors having a failure probability of:

$$P_r(A)=P_r(B)=P_r(C)=P_r(D)=10^{-3}$$

then:

$$P_r(\text{failed system})=2\times 10^{-6}$$

For a mission of one hour this is an improvement in mean time between failures (MTBF) from 1000 hours to 500,000 hours.

This system has thus improved the reliability to a degree comparable to two out of three median selection techniques, but it uses only six sensors (in the three-dimension case) as compared with the nine sensors required in on-axis techniques.

Although the two axis model, which is directly applicable to missiles, has been used as the medium for disclosure of a complete invention, the invention is applicable to a system in any number of axes, particularly the three axes model used in aircraft.

Figure 3:
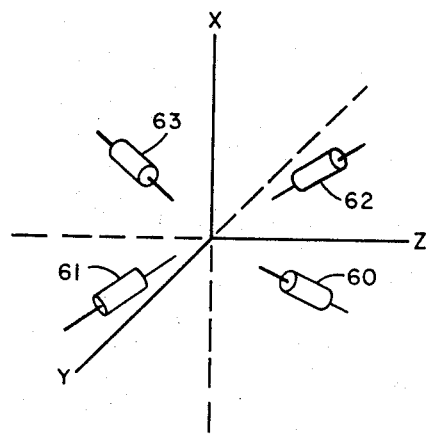
FIGURE 3 illustrates the application of the invention to control about three axes.
Figure 4:
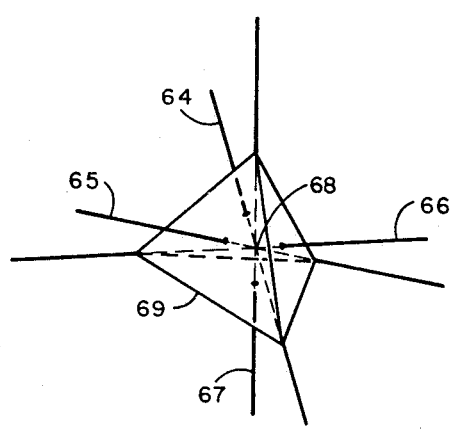
FIGURE 4 illustrates equiangular spacing of four axes intersecting at a single point in space.
Figure 5:
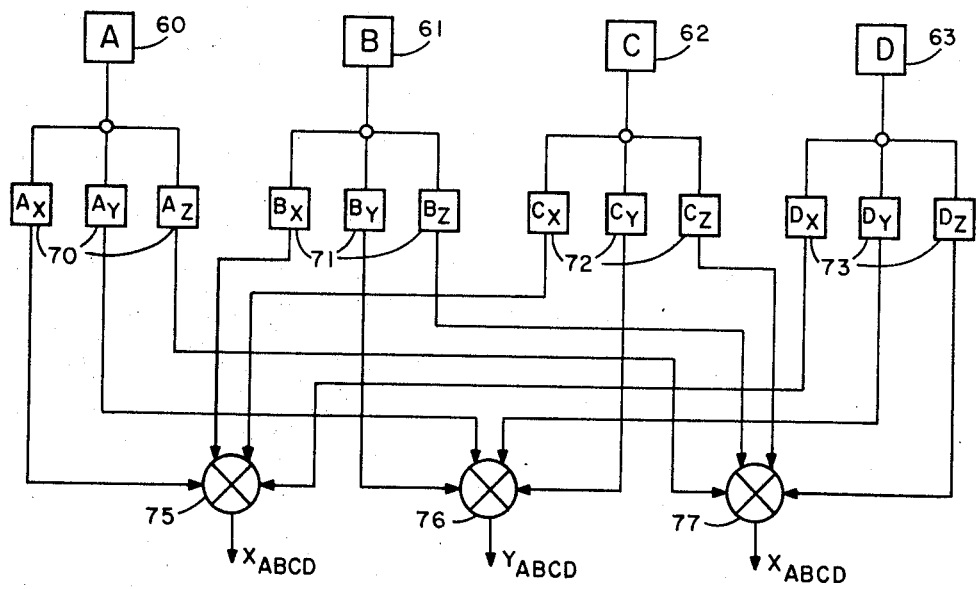
FIGURE 5 is a block diagram illustrating the application of four sensors to control about three axes.

FIGURES 3, 4 and 5 pertain to the specific application of the invention to obtain a single failure redundancy in a three axis environment through use of only four sensors, i.e. $n+1$ sensors where $n$ equals the number if axes.

FIGURE 3 shows a set of orthogonal axes, X, Y, Z, and four sensors, 60, 61, 62 and 63, having their sensitive axes divergent but also nonparallel and nonperpendicular to each other and to the orthogonal axes. This arrangement obtains the benefits of random spacing as it minimizes the effect of single motions and permits resolution of measured quantities into orthogonal axes components. The sensors themselves can have their axes passing through the orthogonal zero, aligned parallel to the ones shown (not passing through orthogonal zero) or non-oriented with respect to the orthogonal, but the last case would require a major effort for resolution. Good coverage for resolution can be obtained by approximately equiangular spacing of sensor axes with no sensor axis being parallel or perpendicular to an orthogonal axis. The exactly equiangular relationship is illustrated in FIGURE 4 where axes 64, 65, 66, 67 pass through common point 68 at the supplementary angles of 71.5° and 109.5° with each of the other three. Also illustrated in FIGURE 4 is a tetrahedron 69 useable to orient the axes 64–67 in the relationship. The tetrahedron is the one of the regular geometrical figures having equally divergent directions from faces or vertices that has exactly four of such directions. The perpendiculars to the face centers run through the opposite vertices and intersect at a common interior point and make the angles of 71.5° and 109.5° described.

FIGURE 5 is a block diagram similar to the lower portion of FIGURE 1 but using four sensors and applying the information to three axes. A, B, C and D represent values sensed by sensors 60–63 respectively about its own axis. Each output is resolved by resolvers 70, 71, 72 and 73 into orthogonal X, Y and Z components. These components are then used as for example by sensing means 75, 76, 77 to obtain a value of the sensed motion with respect to each orthogonal axis. As illustrated, each orthogonal value is a result of four inputs, any one of which can be dropped without impairing results thereby defining a one failure redundancy.

While particular embodiments of the invention have been shown and described herein, it is not intended that the invention be limited to such disclosure, but that changes and modifications can be made and incorporated within the scope of the claims.

What is claimed is:
1. In a vehicle control system, an apparatus for sensing and reporting vehicular motion relative to vehicle axes comprising:
  (a) a set of sensors each having a sensitive axis and producing electrical signals conveying information concerning movement of said sensors with respect to their sensitive axes;
  (b) electrical resolver means responsive to said signals for translating said signals into information concerning vehicular motion with respect to said vehicular axes;
  (c) said set of sensors containing exactly one sensor in excess of the number of said vehicular axes relative to which vehicular motion is to be sensed and reported; and
  (d) said sensors being oriented with their sensitive axes having an angular relationship by intersect or projection to each other and to said vehicular axes relative to which vehicular motion is to be sensed and reported of other than superimposition, parallelism or perpendicularity whereby failure of one said sensor will not degrade said information concerning vehicular motion produced by said resolver means.

2. The apparatus of claim 1 wherein:
  (e) said sensors are located at separate positions in said vehicle whereby local motion resulting from vehicle flexing will be minimized.
3. The apparatus of claim 1 wherein:
  (e) the said vehicular axes relative to which vehicular motion is to be sensed and reported are the three orthogonal axes of the vehicle about which pitch, roll and yaw are sensed; and
  (f) the said set of sensors include four sensors.
4. The apparatus of claim 3 wherein:
  (f) the said vehicular axes relative to which vehicular motion is to be sensed and reported are the three orthogonal axes of the vehicle about which pitch, roll and yaw are sensed; and
  (g) the said set of sensors include four sensors.
5. In a vehicle control system including sensors for detecting motion with respect to the three orthogonal axes of said vehicle and producing information bearing electrical signals, the improvement comprising:
  (a) four sensors, each having a sensitive axis determining the orientation for said information bearing electrical signals produced by it;
  (b) each said sensor being oriented with its sensitive axis parallel to one of four lines intersecting at a common point at equal angles of deviation from each other with only one said sensor being so oriented with respect to each such line; and
  (c) resolver means responsive to said information bearing electrical signals for converting said signals to new signals defining motion with respect to said orthogonal axes whereby failure of one said sensor will not degrade.
6. The system of claim 5 wherein:
  (d) no one of said four lines are perpendicular or parallel to one of said orthogonal axes.
7. The system of claim 6 wherein:
  (e) said sensors are located in the vehicle with sufficient separation between any two of said sensors so that no two of said four sensors are subject to the same local motions, whereby said resolver means also averages out extraneous information caused by local movements of portions of said vehicle.

References Cited

UNITED STATES PATENTS

| 2,870,979 | 1/1959 | Tribken et al. | 244—79 |
| 3,070,071 | 12/1962 | Cooper | 318—20.075 X |
| 3,100,861 | 8/1963 | Osder | 244—77 X |
| 3,216,676 | 11/1965 | Brown et al. | 244—77 |
| 3,283,229 | 11/1966 | Lindahl | 318—20.075 X |
| 3,351,315 | 11/1967 | Carson et al. | 244—77 |
| 3,379,951 | 4/1968 | Franchi et al. | 318—489 |
| 3,403,874 | 10/1968 | Boskovich et al. | 244—77 |

FOREIGN PATENTS

| 961,259 | 6/1964 | Great Britain. |
| 126,623 | 5/1959 | U.S.S.R. |

MALCOLM A. MORRISON, Primary Examiner

R. W. WEIG, Assistant Examiner

U.S. Cl. X.R.

244—77; 318—18, 30